(12) United States Patent
Son et al.

(10) Patent No.: US 10,297,830 B2
(45) Date of Patent: May 21, 2019

(54) POLYMER-SULFUR COPOLYMER, METHOD FOR PREPARING SAME, AND LITHIUM-SULFUR BATTERY COMPRISING SAME

(71) Applicants: LG CHEM, LTD., Seoul (KR); KOREA ADVANCED INSTITUTE OF SCIENCE AND TECHNOLOGY, Daejeon (KR)

(72) Inventors: Byoung Kuk Son, Daejeon (KR); Jang Wook Choi, Daejeon (KR); Ali Coskun, Daejeon (KR); Min Chul Jang, Daejeon (KR); Doo Kyung Yang, Daejeon (KR)

(73) Assignees: LG CHEM, LTD., Seoul (KR); KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 0 days.

(21) Appl. No.: 15/741,633

(22) PCT Filed: Jan. 24, 2017

(86) PCT No.: PCT/KR2017/000789
§ 371 (c)(1),
(2) Date: Jan. 3, 2018

(87) PCT Pub. No.: WO2017/200180
PCT Pub. Date: Nov. 23, 2017

(65) Prior Publication Data
US 2018/0190989 A1    Jul. 5, 2018

(30) Foreign Application Priority Data

May 17, 2016  (KR) .................. 10-2016-0060079
Jan. 23, 2017  (KR) .................. 10-2017-0010453

(51) Int. Cl.
*H01M 4/60*     (2006.01)
*H01M 10/052*   (2010.01)
(Continued)

(52) U.S. Cl.
CPC ............ *H01M 4/606* (2013.01); *C08G 73/02* (2013.01); *C08G 73/0233* (2013.01);
(Continued)

(58) Field of Classification Search
None
See application file for complete search history.

(56) References Cited

U.S. PATENT DOCUMENTS

2013/0040197 A1   2/2013   Liu et al.
2013/0150545 A1   6/2013   Gorodisher et al.
(Continued)

FOREIGN PATENT DOCUMENTS

JP   2011-231027 A   11/2011
JP   2015-530462 A   10/2015
(Continued)

OTHER PUBLICATIONS

Arslan et al., "Combining Elemental Sulfur with Polybenzoxazines via Inverse Vulcanization", Macromolecules, 2016, vol. 49, pp. 767-773.
(Continued)

*Primary Examiner* — Sarah A. Slifka
(74) *Attorney, Agent, or Firm* — Birch, Stewart, Kolasch & Birch, LLP (57) ABSTRACT

The present invention relates to a polymer-sulfur copolymer, a preparation method thereof, and a lithium-sulfur battery including the same.
In the case of the polymer-sulfur copolymer according to the present invention, since the carrier is polymerized, there is no possibility that the carrier is eluted, and since the sulfur
(Continued)

is covalently bonded to the polymer and uniformly distributed in a certain size in the copolymer, when used as a positive electrode active material for the lithium-sulfur battery, the problem of elution of the polysulfide can be improved. In addition, the polymer-sulfur copolymer according to the present invention has a high sulfur impregnation amount, thereby making it possible to realize a high capacity battery.

10 Claims, 7 Drawing Sheets

(51) Int. Cl.
    *H01M 4/137* (2010.01)
    *H01M 4/13* (2010.01)
    *H01M 4/136* (2010.01)
    *H01M 4/139* (2010.01)
    *H01M 4/1397* (2010.01)
    *H01M 4/1399* (2010.01)
    *H01M 4/38* (2006.01)
    *C08G 73/02* (2006.01)
    *H01M 4/02* (2006.01)

(52) U.S. Cl.
    CPC ............. *H01M 4/13* (2013.01); *H01M 4/136* (2013.01); *H01M 4/137* (2013.01); *H01M 4/139* (2013.01); *H01M 4/1397* (2013.01); *H01M 4/1399* (2013.01); *H01M 4/38* (2013.01); *H01M 4/382* (2013.01); *H01M 4/602* (2013.01); *H01M 10/052* (2013.01); *H01M 2004/028* (2013.01)

(56) References Cited

U.S. PATENT DOCUMENTS

| | | |
|---|---|---|
| 2014/0199592 A1 | 7/2014 | Pyun et al. |
| 2015/0111100 A1 | 4/2015 | He et al. |
| 2015/0218429 A1 | 8/2015 | Salnikov et al. |

FOREIGN PATENT DOCUMENTS

| | | |
|---|---|---|
| KR | 10-2000-0074102 A | 12/2000 |
| KR | 10-0659583 B1 | 12/2006 |
| KR | 10-2015-0065751 A | 6/2015 |

OTHER PUBLICATIONS

Chung et al., "The use of elemental sulfur as an alternative feedstock for polymeric materials", Nature Chemistry, 2013, vol. 5, 7 pages.
Dirlam et al., "Inverse vulcanization of elemental sulfur with 1,4-diphenylbutadiyne for cathode materials in Li—S batteries", RSC Advances, 2015, vol. 5, pp. 24718-24722.
Escobar et al., "Thermal curing study of bisphenol A benzoxazine for barrier coating applications on 1050 aluminum alloy", Progress in Organic Coatings, 2015, vol. 79, pp. 53-61.
Griebel et al., "Kilogram Scale Inverse Vulcanization of Elemental Sulfur to Prepare High Capacity Polymer Electrodes for Li—S Batteries", Journal of Polymer Science, 2015, vol. 53, pp. 173-177.
International Search Report for PCT/KR2017/000789 (PCT/ISA/210) dated May 4, 2017.
Kim et al., "Synthesis of three-dimensionally interconnected sulfur-rich polymers for cathode materials of high-rate lithium-sulfur batteries", Nature Communications, 2015, vol. 6, 10 pages.
Talapaneni et al., "Elemental-Sulfur-Mediated Facile Synthesis of a Covalent Triazine Framework for High-Performance Lithium-Sulfur Batteries", Angewandte Chemie International Edition, 2016, vol. 55, pp. 3106-3111.
Extended European Search Report, dated Nov. 30, 2018, for European Application No. 17799538.8.

POLYMER-SULFUR COPOLYMER, METHOD FOR PREPARING SAME, AND LITHIUM-SULFUR BATTERY COMPRISING SAME

TECHNICAL FIELD

The present application claims priority to and the benefits of Korean Patent Application No. 10-2016-0060079 filed on May 17, 2016 and Korean Patent Application No. 10-2017-0010453 filed on Jan. 23, 2017, all the contents of which are incorporated herein by reference.

The present invention relates to a polymer-sulfur copolymer, a preparation method thereof, and a lithium-sulfur battery including the same.

BACKGROUND ART

Recently, as portable electronic devices, electric vehicles, large-capacity power storage systems and the like have been developed, the need for large-capacity batteries is increasing. The lithium-sulfur battery is a secondary battery using a sulfur-based material having an S—S bond (Sulfur-Sulfur bond) as a positive electrode active material and using lithium metal as a negative electrode active material. The Lithium-sulfur battery has advantages in that sulfur, which is the main material of the positive electrode active material, is very rich in resources, is not toxic, and has a low atomic weight.

In addition, theoretical discharge capacity of the lithium-sulfur battery is 1672 mAh/g-sulfur, and its theoretical energy density is 2,600 Wh/kg. Since the energy density of the lithium-sulfur battery is much higher than the theoretical energy density of other battery systems currently under study (Ni-MH battery: 450 Wh/kg, Li—FeS battery: 480 Wh/kg, Li—$MnO_2$ battery: 1,000 Wh/kg, Na—S battery: 800 Wh/kg), the lithium-sulfur battery is attracting attention as a battery having high energy density characteristics.

However, the shuttle phenomenon in which the intermediate lithium polysulfide is dissolved and moves between the positive electrode and the negative electrode shortens the lifetime of the battery and thus becomes a major obstacle to the commercialization of lithium-sulfur battery. In addition, it is difficult to increase the density of sulfur in the electrode, so that it is difficult to realize a battery having a high energy density unlike the theoretically known understanding and this is one of the problems to be overcome in lithium-sulfur battery.

In order to solve the above problems, a method of impregnating a carrier such as a polymer with sulfur is used. The most commonly used method is a method of causing elemental sulfur to be contained in a porous conductive medium such as mesoporous carbon (CMK-3). By using this method, the cycling characteristics could be improved to some extent while complementing the low conductivity of the sulfur. However, since the sulfur was not completely contained in the pores, the problem of elution of the polysulfide still occurred. In addition, since sulfur is impregnated in the carrier already synthesized, the impregnation amount of sulfur is limited depending on the pore volume of the carrier, and thus there was a problem that the final impregnation amount is difficult to be over 50%. Accordingly, a method for attaching an organic linker to the pure sulfur complex to increase the impregnation amount of sulfur was attempted, but there was a problem that the organic linker has been eluted in the electrolyte during the electrochemical reaction.

Therefore, it is necessary to develop a positive electrode active material for stable lithium-sulfur battery, which can increase the impregnation amount of sulfur and improve the problem of dissolving lithium polysulfide, and does not have the risk of elution of the carrier.

[Prior art document] Korean Patent Publication No. 2000-0074102, sulfur positive electrode with ultra-high capacity for lithium battery, preparation method thereof, and lithium battery using sulfur positive electrode.

DISCLOSURE

Technical Problem

In order to solve the above problems, the inventors of the present invention have prepared a polymer-sulfur copolymer by polymerizing monomer having a ring-opening functional group and a sulfur-philic group and elemental sulfur, and have completed the present invention by confirming that the polymer-sulfur copolymer thus obtained exhibits higher sulfur impregnation amount and more uniform distribution of sulfur than the conventional sulfur complex, thereby exhibiting enhanced battery characteristics when applied as a positive electrode active material of a lithium-sulfur battery.

Accordingly, an object of the present invention is to provide a polymer-sulfur copolymer.

In addition, another object of the present invention is to provide a preparation method for the polymer-sulfur copolymer.

In addition, still another object of the present invention is to provide an electrode including the polymer-sulfur copolymer as an active material and a lithium-sulfur battery including the electrode.

Technical Solution

In order to accomplish the above object, the present invention provides a polymer-sulfur copolymer formed by polymerization of monomers represented by the following formula (1) and elemental sulfur, an electrode including the same as an active material, and a lithium-sulfur battery including the electrode:

[Formula 1]

wherein, X, Y and Z are as described in the specification.

In addition, the present invent provides a preparation method for the polymer-sulfur copolymer characterized by comprising; mixing the monomer represented by formula (1) and elemental sulfur to form a mixture; subjecting the mixture to a first heat treatment to impregnate the liquefied sulfur with monomer; subjecting the mixture subjected to the first heat treatment to a second heat treatment to copolymerize the monomer and elemental sulfur; and subjecting the mixture subjected to the second heat treatment to a third heat treatment to perform a vulcanization reaction.

Advantageous Effects

In the case of the polymer-sulfur copolymer according to the present invention, since the carrier is polymerized, there is no possibility that the carrier is eluted, and since the sulfur is covalently bonded to the polymer and uniformly distributed in a certain size in the copolymer, when applied as a positive electrode active material for the lithium-sulfur battery, the problem of elution of the polysulfide can be improved. In addition, the polymer-sulfur copolymer according to the present invention has a high sulfur impregnation amount, thereby making it possible to realize a high capacity battery.

BEST MODE

Hereinafter, embodiments of the invention will be described in detail with reference to the accompanying drawings so that those skilled in the art can easily carry out the present invention. However, the present invention may be embodied in many different forms and should not be construed as limited to the embodiments set forth herein.

Polymer-Sulfur Copolymer

The present invention provides a polymer-sulfur copolymer formed by polymerization of monomers represented by the following formula (1) and elemental sulfur:

[Formula 1]

wherein,
X is O or S,
Y is H, a C1 to C6 alkyl group or a C6 to C12 aryl group,
Z is a $S_nH$ group, a C1 to C6 alkyl group containing at least one S—S bond, or a C6 to C12 aryl group containing at least one S—S bond,
n is an integer of 1 to 6.

The C1 to C6 alkyl group as mentioned in the present specification may be a methyl group, an ethyl group, a propyl group, an isopropyl group, a butyl group, an isobutyl group, a pentyl group or a hexyl group.

The C6 to C12 aryl group as mentioned in the present specification may be a phenyl group or a naphthyl group substituted or unsubstituted with a C1 to C6 alkyl group.

The C1 to C6 alkyl group containing at least one S—S bond as mentioned in the present specification means a substituent of a methyl group, an ethyl group, a propyl group, an isopropyl group, a butyl group, a pentyl group, or a hexyl group comprising at least one S—S bond between a C—C bond or a C—H bond. For example, the C1 to C6 alkyl group containing at least one S—S bond may be a substituent such as —S—S—CH$_3$, —S—S—S—CH$_3$, —CH$_2$—S—S—CH$_3$, —(CH$_2$)$_2$—S—S—CH$_3$, —S—S—(CH$_2$)$_2$—CH$_3$, —(CH$_2$)$_3$—S—S—S—CH$_3$ or —(CH$_2$)$_4$—S—S—S—H.

In addition, the C6 to C12 aryl group containing at least one S—S bond as mentioned in the present specification means a substituent of a phenyl group or a naphthyl group substituted or unsubstituted with a C1 to C6 substituent comprising at least one S—S bond between a C—C bond or a C—H bond. For example, the C6 to C12 aryl group containing at least one S—S bond may be a substituent such as —S—S—C$_6$H$_5$ or —C$_6$H$_4$—S—S—H.

The monomer represented by the formula (1) has a sulfur-philic group such as substituent Z, and thus can be polymerized with elemental sulfur (S8).

The monomer represented by Formula (1) may be a benzoxazine derivative or a benzothiazine derivative having a ring-opening functional group. Preferably, in Formula (1), X may be O or S, Y may be a C1 to C4 alkyl group or a C6 to C8 aryl group, and Z may be S—S, SH, or S—SH. For example, the compound of formula (1) may include the compounds represented by the following formulas (2) to (6).

[Formula 2]

[Formula 3]

-continued

[Formula 4]

[Formula 5]

[Formula 6]

Such benzoxazine and benzothiazine derivatives can synthesize benzoxazine or benzothiazine polymers through ring-opening polymerization (ROP). Since the benzoxazine or benzothiazine polymers exhibit excellent mechanical, thermal and electrical properties, polymer-sulfur composites prepared using them can be used as a positive electrode active material for the lithium-sulfur battery.

The monomer represented by Formula (1) has a sulfur-philic group and a ring-opening functional group, so that it is possible to polymerize with elemental sulfur through the sulfur-philic group of the monomer simultaneously with the synthesis of the polymer by ring-opening polymerization.

When Y is aromatic as in the above formulas (3), (4) and (6), the stability of the polymer itself becomes higher than that of the aliphatic groups as in formulas (2) and (5), and at a high temperature, sulfur forms a C—S bond through the substitution reaction with hydrogen of the benzene ring, so that the life characteristics are more advantageous.

Also, when X is S as in the above formula (5), the loading amount of the electrode can be increased, when X is O as in the above formulas (2), (3), (4) and (6), ring-opening polymerization is more likely to occur.

In the polymer-sulfur copolymer according to the present invention, since sulfur forms a covalent bond with the polymer, the polysulfide is not eluted in the charge/discharge cycle when used as a positive electrode active material of the lithium-sulfur battery, and also since the carrier is polymerized, there is no problem that the carrier is eluted into the electrolyte. In addition, since it has a high sulfur impregnation amount of about 72 wt. %, it is possible to realize a lithium-sulfur battery with high capacity.

In the polymer-sulfur copolymer according to the present invention, the weight ratio of the monomer to elemental sulfur is 1:2 to 1:20. If the weight ratio is less than the above range, it is difficult to realize a high-capacity electrode because the impregnation amount of sulfur is low. If the weight ratio is more than the above range, sulfur cannot be completely contained in the polymer which is a carrier and thus it is difficult to solve the problem of elution of the polysulfide. Accordingly, the weight ratio is appropriately adjusted within the above range.

More specifically, as the content of sulfur increases, the loading amount of electrode increases, but the capacity reduction of the battery relative to the initial capacity occurs more quickly. This is because when the weight ratio of sulfur is increased, sulfur which is not completely covalently bonded with benzoxazine is eluted into the electrolyte.

Preparation Method of Polymer-Sulfur Copolymer

The present invention provides a preparation method for the polymer-sulfur copolymer characterized by comprising;

mixing the monomer represented by formula (1) and elemental sulfur to form a mixture;

subjecting the mixture to a first heat treatment to impregnate the liquefied sulfur with monomer;

subjecting the mixture subjected to the first heat treatment to a second heat treatment to copolymerize the monomer and elemental sulfur; and subjecting the mixture subjected to the second heat treatment to a third heat treatment to perform a vulcanization reaction:

[Formula 1]

wherein X, Y and Z are as described in the specification.

Figure 1:
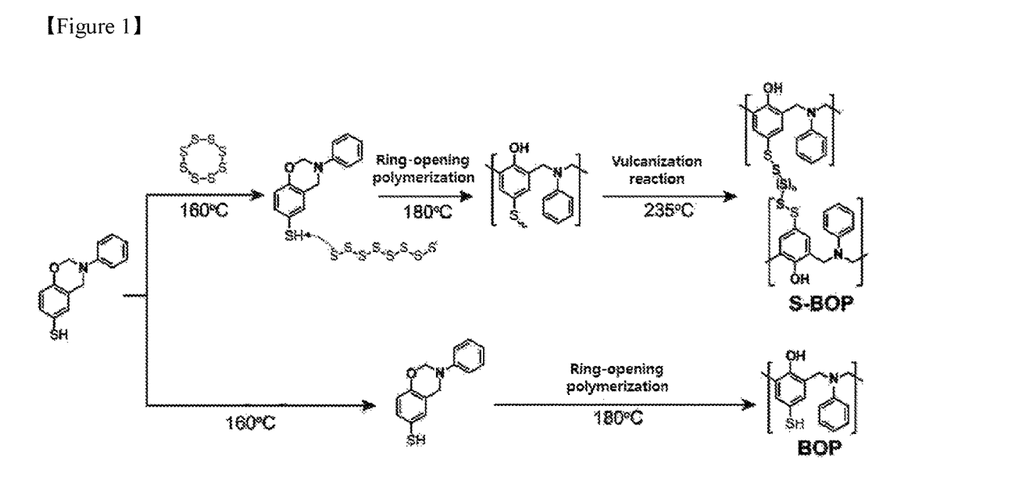
FIG. 1 schematically shows a preparation method for a polymer-sulfur copolymer according to an embodiment of the present invention and a method of preparing a polymer without adding sulfur.

FIG. 1 schematically shows a preparation method for a polymer-sulfur copolymer according to an embodiment of the present invention and a preparation method for a polymer without adding sulfur.

Hereinafter, the preparation method for the polymer-sulfur copolymer according to the present invention will be described step by step in detail.

First, the monomer represented by Formula (1) and elemental sulfur are mixed to form a mixture.

At this time, the monomer and elemental sulfur are mixed at a weight ratio of 1:2 to 1:20, and no solvent or catalyst is required.

Next, the mixture is subjected to a first heat treatment to impregnate the liquefied sulfur with monomer.

The first heat treatment is a treatment for liquefying sulfur powder to impregnate a monomer and uniformly mixing sulfur and monomer wherein the heat treatment is performed in vacuum or argon atmosphere for 5 to 24 hours, preferably 7 to 15 hours by heating the mixture to 120 to 170° C., preferably 140 to 170° C.

Next, the mixture is subjected to a second heat treatment so that the polymerization of the monomer can take place.

The secondary heat treatment is performed at 170 to 200° C. for 2 to 10 hours. By the second heat treatment, benzoxazine or benzothiazine derivative is subjected to ring-opening polymerization to form a polymer. At the same time, a ring opening reaction of elemental sulfur occurs to form a linear polysulfane, which is then added to the sulfur-philic group of the benzoxazine or benzothiazine derivative. Thus, since the polymerization of the polymer and the impregnation of sulfur into the polymer occur simultaneously, the sulfur is uniformly distributed in the polymer matrix.

Finally, the mixture subjected to the second heat treatment is subjected to a third heat treatment to perform a vulcanization reaction.

The third heat treatment is for crosslinking the linear polymers through a polysulfane covalently bonded to the polymer, and is performed at 200 to 250° C. for 5 to 24 hours, preferably 7 to 15 hours. Through the third heat treatment, sulfur in the crosslinked polymer-sulfur complex is covalently bonded to the polymer chain and has a structure restricted to the polymer.

According to the preparation method for the polymer-sulfur copolymer of the present invention, since the polymer-sulfur copolymer is prepared by uniformly mixing the monomer and sulfur by the first heat treatment and then performing the second heat treatment and the third heat treatment, the prepared copolymer has a uniform sulfur distribution and the sulfur is confined within the polymer and thus there is no risk of polysulfide being eluted when used as a positive electrode active material. In addition, since the carrier is also polymerized, there is no risk of elution of the carrier, and thus the battery characteristics can be improved.

Lithium-Sulfur Battery

The lithium-sulfur battery according to the present invention includes a positive electrode, a negative electrode, a separator interposed therebetween and an electrolyte, and uses a polymer-sulfur copolymer according to the present invention as a positive electrode active material.

In the case of the lithium-sulfur battery according to the present invention, the problem of elution of polysulfide in the positive electrode active material and the problem of elution of the carrier are improved, so that the battery characteristics are excellent, and the sulfur impregnation amount is high, and thus it is possible to realize high capacity.

The construction of the positive electrode, negative electrode, separator and electrolyte of the lithium-sulfur battery is not particularly limited in the present invention, and is in accordance with that as well known in the art.

Positive Electrode

The positive electrode according to the present invention includes a positive electrode active material formed on a positive electrode current collector, and the polymer-sulfur copolymer according to the present invention is used as the positive electrode active material.

The positive electrode current collector may be any one as long as it can be used as a current collector in the related art. Specifically, it may be preferable to use foamed aluminum or foamed nickel, etc. having excellent conductivity.

The conductive material may be porous. Therefore, any conductive material may be used without limitation as long as it has porosity and conductivity, and for example, carbon-based materials having porosity may be used. Examples of the carbon-based materials may include carbon black, graphite, graphene, activated carbon, carbon fiber, and the like. In addition, metallic fibers such as metal mesh; metallic powders such as copper, silver, nickel, and aluminum; or organic conductive materials such as polyphenylene derivatives may also be used. The conductive materials may be used alone or in combination.

The positive electrode may further comprise binders for bonding of the positive electrode active material and the conductive material and for bonding to the current collector. The binders may comprise thermoplastic resins or thermosetting resins. For example, polyolefins such as polyethylene, polypropylene, polytetrafluoro ethylene (PTFE), polyvinylidene fluoride (PVDF), styrene-butadiene rubber, tetrafluoroethylene-perfluoro alkylvinylether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoro propylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethylvinylether-tetrafluoro ethylene copolymer and ethylene-acrylic copolymer, etc. can be used alone or in combination, but it is not necessarily limited to these and any one that can be used as a binder in the art can be used.

The positive electrode as described above can be produced by the conventional method. Specifically, the positive electrode is prepared by mixing the positive electrode active material, the conductive material, and the binder in an organic solvent to form a composition for forming the layer of the positive electrode active material, applying such a composition on the current collector, drying it, and optionally compressing and molding it into the current collector for the purpose of improving the density of the electrode. At this time, as the organic solvent, it is preferable to use an organic solvent which can uniformly disperse the positive electrode active material, the binder and the conductive material, and is easily evaporated. Specifically, N-methyl-2-pyrrolidone, acetonitrile, methanol, ethanol, tetrahydrofuran, water, isopropyl alcohol and the like may be included.

Negative Electrode

The negative electrode according to the present invention includes a negative electrode active material formed on the negative electrode current collector.

The negative electrode current collector may be specifically selected from the group consisting of copper, stainless steel, titanium, silver, palladium, nickel, alloys thereof, and combinations thereof. The stainless steel can be surface treated with carbon, nickel, titanium or silver, and the alloy may be an aluminum-cadmium alloy. In addition to those, a nonconductive polymer the surface of which is treated with sintered carbon, i.e. a conductive material, or a conductive polymer, etc. may be used.

The negative electrode active material may include materials capable of reversibly intercalating or deintercalating lithium ion ($Li^+$), materials capable of reversibly forming lithium containing compounds by reacting with lithium ion, lithium metal or lithium alloy. The materials capable of reversibly intercalating or deintercalating lithium ion ($Li^+$) can be, for example, crystalline carbon, amorphous carbon, or a mixture thereof. The materials capable of reacting with lithium ion ($Li^+$) to reversibly form lithium containing compounds may be, for example, tin oxide, titanium nitrate or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

The negative electrode may further include a binder for bonding of the negative electrode active material and the conductive material and for bonding to the current collector. Specifically, the binder is the same as described above for the binder of the positive electrode.

Also, the negative electrode may be lithium metal or lithium alloy. The non-limiting examples of the negative electrode may be a thin film of lithium metal, and may be an alloy of lithium and at least one metal selected from the group consisting of Na, K, Rb, Cs, Fr, Be, Mg, Ca, Sr, Ba, Ra, Al and Sn.

Separator

The conventional separator can be interposed between the positive electrode and the negative electrode. The separator is a physical separator having a function of physically separating electrodes. Any separator can be used without any particular limitations as long as it is used as a conventional separator. Particularly, a separator with excellent electrolyte humidification ability while exhibiting low resistance to ion migration of electrolyte is preferable.

In addition, the separator enables the lithium ion to be transported between the positive electrode and the negative electrode while separating or insulating the positive electrode and the negative electrode from each other. Such separator may be made of a porous, nonconductive or insulating material. The separator may be an independent member such as a film, or a coating layer added to the positive electrode and/or the negative electrode.

Specifically, a porous polymer film, for example, a porous polymer film made of a polyolefin-based polymer such as ethylene homopolymer, propylene homopolymer, ethylene/butene copolymer, ethylene/hexene copolymer and ethylene/methacrylate copolymer, etc. may be used alone or in a laminate thereof, or a conventional porous nonwoven fabric, for example, a nonwoven fabric made of glass fiber, polyethyleneterephthalate fiber or the like with high melting point can be used, but are not limited thereto.

Electrolyte

The electrolyte according to the present invention is a non-aqueous electrolyte containing lithium salt and is composed of lithium salt and a solvent wherein as the solvent, a non-aqueous organic solvent, an organic solid electrolyte and an inorganic solid electrolyte, etc. can be used.

The lithium salt is a substance which can be easily dissolved in a non-aqueous organic solvent, and for example, may be at least one selected from the group consisting of LiCl, LiBr, LiI, LiClO$_4$, LiBF$_4$, LiB$_{10}$Cl$_{10}$, LiB(Ph)$_4$, LiC$_4$BO$_8$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, LiN(C$_2$F$_5$SO$_2$)$_2$, LiN(SO$_2$F)$_2$, lithium chloroborane, lithium lower aliphatic carboxylate, lithium tetraphenyl borate, and lithium imide The concentration of the lithium salt may be 0.1 to 4.0 M, preferably 0.5 to 2.0 M depending on various factors such as the exact composition of the electrolyte mixture, the solubility of the salt, the conductivity of the dissolved salt, the charge and discharge conditions of the battery, the operating temperature and other factors known in the lithium-sulfur battery field. If the concentration of the lithium salt is less than the above range, the conductivity of the electrolyte may be lowered and thus the performance of the battery may be deteriorated. If the concentration of the lithium salt exceeds the above range, the viscosity of the electrolyte may increase and thus the mobility of the lithium ion (Li$^+$) may be reduced. Accordingly, it is preferable to select an appropriate concentration of the lithium salt within the above range.

The non-aqueous organic solvent is a substance capable of dissolving a lithium salt well, and preferably, aprotic organic solvents such as N-methyl-2-pyrrolidone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, 1-ethoxy-2-methoxyethane, tetraethyleneglycol dimethylether, tetrahydroxy franc, 2-methyl tetrahydrofuran, dimethylsulfoxide, 1,3-dioxolane, 4-methyl-1,3-dioxen, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate can be used alone or in a mixed solvent form of two or more solvents thereof.

As the organic solid electrolyte, preferably, polyethylene derivatives, polyethylene oxide derivatives, polypropylene oxide derivatives, phosphate ester polymers, poly agitation lysine, polyester sulfide, polyvinyl alcohol, polyvinylidene fluoride, and polymers including ionic dissociation groups and the like can be used.

As the inorganic solid electrolyte of the present invention, nitrides, halides, sulfates and the like of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$ may be preferably used.

The non-aqueous electrolyte for the lithium-sulfur battery of the present invention may further comprise nitric acid or nitrous acid-based compounds as an additive. The nitric acid or nitrous acid-based compounds have an effect of forming a stable coating on the lithium electrode and improving the charge-discharge efficiency. The nitric acid or nitrous acid-based compounds include, but are not limited to, at least one selected from the group consisting of inorganic nitric acid or nitrous acid compounds such as lithium nitrate (LiNO$_3$), potassium nitrate (KNO$_3$), cesium nitrate (CsNO$_3$), barium nitrate (Ba(NO$_3$)$_2$), ammonium nitrate (NH$_4$NO$_3$), lithium nitrite (LiNO$_2$), potassium nitrite (KNO$_2$), cesium nitrite (CsNO$_2$), and ammonium nitrite (NH$_4$NO$_2$); organic nitric acid or nitrous acid compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite, and octyl nitrite; organic nitro compounds such as nitromethane, nitropropane, nitrobutane, nitrobenzene, dinitrobenzene, nitropyridine, dinitropyridine, nitrotoluene, and dinitrotoluene, and the combinations thereof. Preferably, lithium nitrate is used.

In addition, the non-aqueous electrolyte may further include other additives for the purpose of improving charge-discharge characteristics, flame retardancy, and the like. Examples of the additives include pyridine, triethylphosphite, triethanolamine, cyclic ether, ethylene diamine, n-glyme, hexaphosphoric triamide, nitrobenzene derivatives, sulfur, quinoneimine dyes, N-substituted oxazolidinone, N, N-substituted imidazolidine, ethylene glycol dialkyl ether, ammonium salt, pyrrole, 2-methoxy ethanol, aluminum trichloride, fluoroethylene carbonate (FEC), propen sultone (PRS), vinylene carbonate (VC) and the like.

The positive electrode, the negative electrode, and the separator included in the lithium-sulfur battery can be prepared according to the common component and preparation method, respectively, and also the appearance of the lithium-sulfur battery is not particularly limited, but may be a cylindrical shape, a square shape, a pouch shape, or a coin shape.

Therefore, according to another embodiment of the present invention, there is provided a battery module including the lithium-sulfur battery as a unit cell and a battery pack including the same. The battery module or the battery pack may be used as a mid or large sized device power source for one or more of power tools; electric vehicles (EVs), hybrid electric vehicles, and plug-in hybrid electric vehicles (PHEVs); or power storage systems.

Hereinafter, in order to facilitate understanding of the present invention, preferred embodiments of the present invention will be described. However, it will be apparent to those skilled in the art that the following examples are only illustrative of the present invention and that various changes and modifications can be made within the scope and spirit of the present invention, and such changes and modifications are intended to be within the scope of the appended claims

Example 1

(1) Preparation of Polymer-Sulfur Copolymer (S-BOP)

0.1 g of a benzoxazine derivative represented by the following formula (3) and 0.5 g of elemental sulfur were uniformly mixed and the atmosphere of the reaction ampule was replaced with argon three times. The temperature was raised to 160° C. (heating rate of 1° C./min) and allowed to react for 10 hours. The temperature was then raised to 180° C. (heating rate of 1° C./min) and allowed to react for 2 hours to initiate thermal ring-opening polymerization. Finally, the vulcanization reaction was carried out at 235° C. for 10 hours. The reaction product was cooled and dried to obtain a polymer-sulfur copolymer product, and the polymer-sulfur copolymer product thus obtained was pulverized into fine powder and used for analysis and electrode preparation.

[Formula 3]

(2) Preparation of Positive Electrode

The polymer-sulfur complex obtained in (1) above as a positive electrode active material, poly(vinylidene fluoride) (PVDF) as a binder, and super-P as a conductive material were dispersed in N-methyl-2-pyrrolidone (NMP) at a mass ratio of 60:10:30 to prepare a positive electrode active material slurry. The prepared positive electrode active material slurry was coated on one side of an aluminum current collector (20 μm) using the doctor blade method and dried in a convection oven at 65° C. for more than 24 hours to prepare a positive electrode. The dried electrode was cut into a circular disk of 12 pi and used as a positive electrode of a lithium-sulfur battery.

(3) Preparation of Lithium-Sulfur Battery

A CR2032 coin cell half battery was fabricated using the positive electrode prepared in (2) above. Lithium metal in the form of a disk with a diameter of 15 mm was used as the negative electrode and polypropylene (PP) with a diameter of 18 mm was used as the separator. Also, the electrolyte containing 1.0 M lithium bis-(trifluoromethylsulfonyl) imide (LiTFSI, LiN(CF$_3$SO$_2$)$_2$) and 0.2 M lithium nitrate (LiNO$_3$) in the solvent of tetraethylene glycol dimethylether (TEGDME):1,3-dioxolane (DOL)=33:67 (volume ratio) was used.

The positive electrode which was cut in the form of a disk having a diameter of 12 mm was placed on the bottom of the coin cell made of stainless steel having a diameter of 20 mm, and then the separator and the lithium metal disk were sequentially laminated and 20 μl of electrolyte was injected. Thereafter, the coin cell was assembled in the order of gasket-spacer-spring-cap, and sealed through the presser to produce a lithium-sulfur coin cell half battery.

Example 2

(1) Preparation of Polymer-Sulfur Copolymer (S-BOP)

The S-BOP was prepared in the same manner as in (1) of Example 1 except that 0.1 g of the benzoxazine derivative shown in formula (3) above and 0.3 g of elemental sulfur are used.

(2) Preparation of Positive Electrode

A positive electrode was prepared in the same manner as in Example 1, except that the benzoxazine polymer prepared in (1) above is used as a positive electrode active material.

(3) Preparation of Lithium-Sulfur Battery

A battery containing the positive electrode prepared in (2) above was prepared in the same manner as in Example 1.

Example 3

(1) Preparation of Polymer-Sulfur Copolymer (S-BOP)

The S-BOP was prepared in the same manner as in (1) of Example 1 except that 0.1 g of the benzoxazine derivative shown in formula (3) above and 1.0 g of elemental sulfur are used.

(2) Preparation of Positive Electrode

A positive electrode was prepared in the same manner as in Example 1, except that the benzoxazine polymer prepared in (1) above is used as a positive electrode active material.

(3) Preparation of Lithium-Sulfur Battery

A battery containing the positive electrode prepared in (2) above was produced in the same manner as in Example 1.

Example 4

(1) Preparation of Polymer-Sulfur Copolymer (S-BOP)

The S-BOP was prepared in the same manner as in (1) of Example 1 except that 0.1 g of the benzoxazine derivative shown in formula (5) below and 0.5 g of elemental sulfur are used.

[Formula 5]

(2) Preparation of Positive Electrode

A positive electrode was prepared in the same manner as in Example 1, except that the benzoxazine polymer prepared in (1) above is used as a positive electrode active material.

(3) Preparation of Lithium-Sulfur Battery

A battery containing the positive electrode prepared in (2) above was prepared in the same manner as in Example 1.

Example 5

(1) Preparation of Polymer-Sulfur Copolymer (S-BOP)

The S-BOP was prepared in the same manner as in (1) of Example 1 except that 0.1 g of the benzoxazine derivative shown in formula (6) below and 0.5 g of elemental sulfur are used.

[Formula 6]

(2) Preparation of Positive Electrode

A positive electrode was prepared in the same manner as in Example 1, except that the benzoxazine polymer prepared in (1) above is used as a positive electrode active material.

(3) Preparation of Lithium-Sulfur Battery

A battery containing the positive electrode prepared in (2) above was prepared in the same manner as in Example 1.

Comparative Example 1

(1) Preparation of Benzoxazine Polymer (BOP)

The BOP without sulfur impregnation was prepared in the same manner as in Example 1 except for the addition of elemental sulfur and the vulcanization reaction.

(2) Preparation of Positive Electrode and Lithium-Sulfur Battery

A positive electrode and a battery were prepared in the same manner as in (2) and (3) of Example 1, except that the benzoxazine polymer prepared in (1) is used as a positive electrode active material.

Comparative Example 2

(1) Preparation of Positive Electrode Active Material

Activated carbon and sulfur at a mass ratio of 3:7 were mixed mechanically and thermal annealing was performed at 158° C. for 12 hours to prepare a positive electrode active material.

Sulfur impregnated into pores of activated carbon was confirmed by BET (Brunauer-Emmett-Teller) surface area analysis. The activated carbon before sulfur impregnation showed a high surface area of 1295 m$^2$/g and a high pore volume of 0.37 cm$^3$/g. However, after sulfur impregnation, these values were reduced to 2.27 m$^2$/g and 0.000002 cm$^3$/g.

(2) Preparation of Positive Electrode and Lithium-Sulfur Battery

A positive electrode and a battery were prepared in the same manner as in (2) and (3) of Example 1, except that the active material prepared in (1) above is used as a positive electrode active material.

<Experimental Example 1> Analysis of Structure, Composition and Morphology of Polymer-Sulfur Copolymer (1) Analysis of Structure of Polymer-Sulfur Copolymer (S-BOP)

Figure 2:
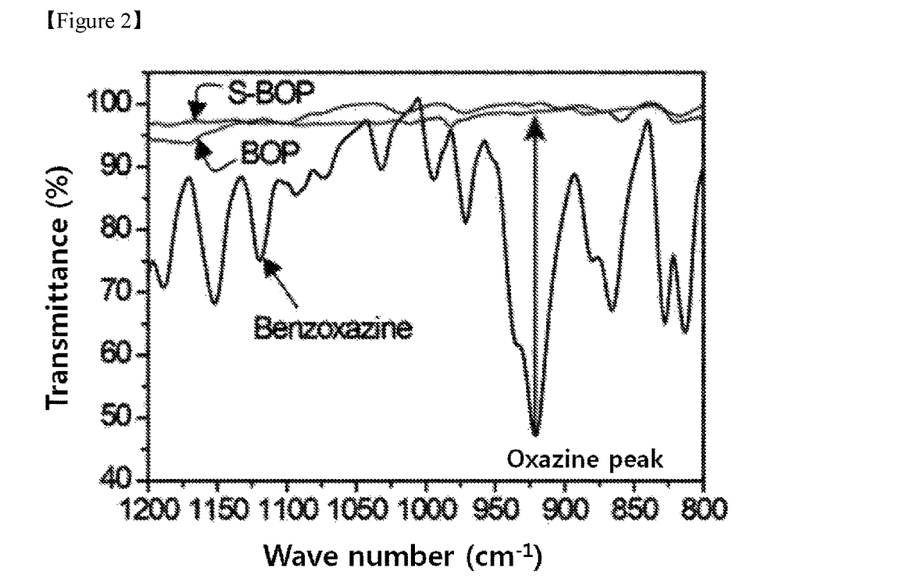
FIG. 2 is infrared spectroscopy (FT-IR) spectra of the S-BOP prepared in Example 1 and the BOP prepared in Comparative Example 1.

The S-BOP prepared in Example 1 was confirmed by infrared spectroscopy (FT-IR) analysis, and the spectrum thereof is shown in FIG. 2. For analysis of the structure, the IR spectra of the benzoxazine derivative of Formula 3 and the BOP prepared in Comparative Example 1, i.e. starting materials are also shown together.

As shown in FIG. 2, the 920 cm$^{-1}$ peak which is the characteristic peak of oxazine disappeared in both the S-BOP and BOP, and from this, it can be seen that benzoxazine polymer was synthesized. Also, from the fact that the spectrum of the S-BOP corresponds to the spectrum of the BOP, it can be seen that sulfur does not interfere with the synthesis of benzoxazine polymer. Also, the distinct peaks at 1452, 1275, and 760 cm$^{-1}$ in the spectra of the S-BOP and BOP are in turn due to the C—H strain vibrations, the C—N stretch and the C—O stretch vibrations of the linear aliphatic portion of the polymer skeleton. The 1100 and 688 cm$^{-1}$ peaks corresponding to C—S bond and aliphatic vibrations were weak in the IR spectrum of the S-BOP compared to the BOP. This is because the vibrations of the C—S bond was suppressed by a high amount of sulfur.

Figure 3:
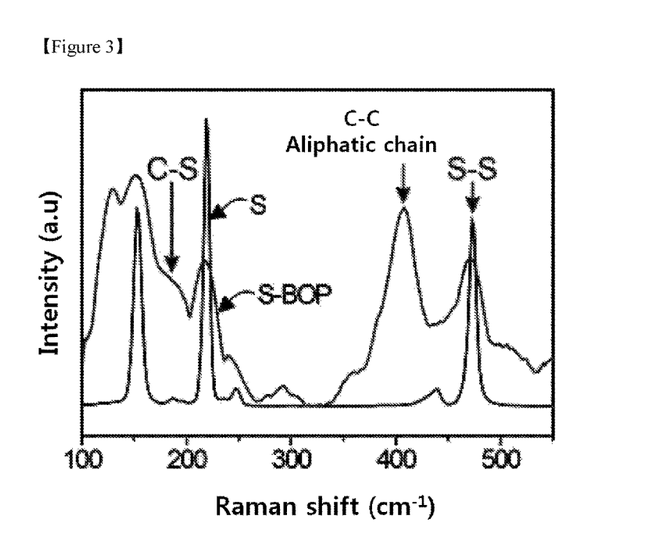
FIG. 3 is Raman spectrum of the S-BOP prepared in Example 1.

The bonding properties of sulfur distributed in the polymer matrix of the S-BOP were confirmed by Raman spectroscopy, and the spectrum thereof is shown in FIG. 3. The peaks at 152, 220, and 473 cm$^{-1}$ which are the peaks of the S—S bonds in the S-BOP and the ν (C—S) peak at 182 cm$^{-1}$ indicate that sulfur was incorporated into the polymer backbone by chemical bond. In addition, since the oxazine ring changed to the aliphatic chain, a strong and broad peak at 407 cm−1 appeared. This also proves that the S-BOP was synthesized.

Figure 4:
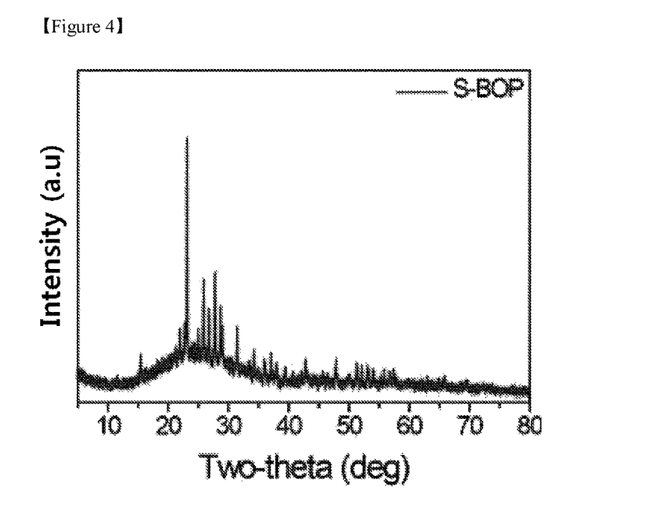
FIG. 4 is the results of powder X-ray diffraction (PXRD) of the S-BOP prepared in Example 1.

The crystallinity of the S-BOP was measured by powder X-ray diffraction (PXRD) analysis, and the results are shown in FIG. 4. Referring to FIG. 4, from the fact that as no distinctive pattern appears over the entire 2θ range of 20° to 80°, it can be seen that the S-BOP skeleton is amorphous. However, it can be seen from the sharp diffraction peak that crystalline elemental sulfur is trapped in the polymer matrix even after undergoing the vulcanization step at the high temperature.

(2) Analysis of Components of Polymer-Sulfur Copolymer

Figure 5:
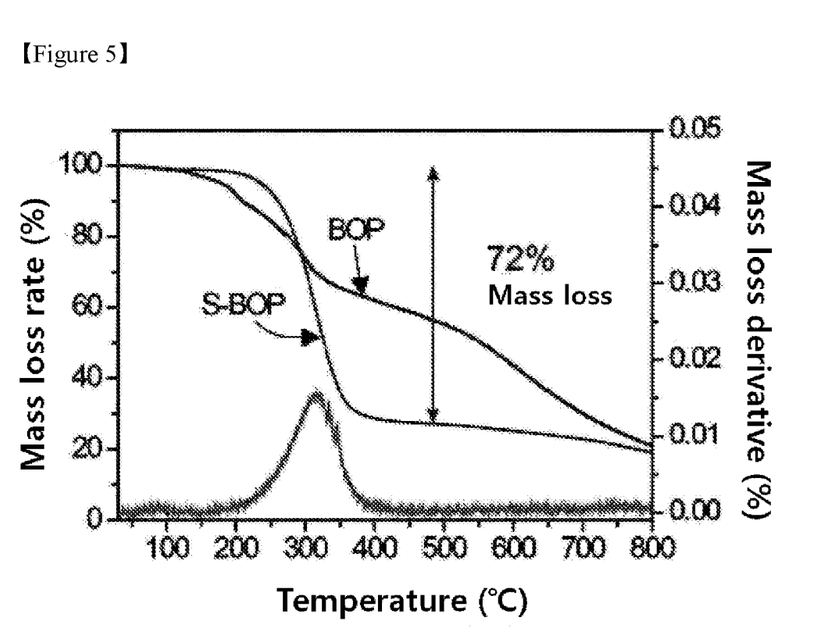
FIG. 5 is the results of thermogravimetric analysis (TGA) of the S-BOP prepared in Example 1.

In order to confirm the bonding stability and content of sulfur which affect the performance of the sulfur positive electrode, elemental analysis (EA) and thermogravimetric analysis (TGA) on the S-BOP of Example 1 were performed, and the TGA result is shown in FIG. 5. For comparative analysis, TGA was also performed on the BOP and the S-AC of Comparative Examples 1 and 2.

In EA, the content of sulfur in the S-BOP was found to be 77%, but in a thermogravimetric analysis under the nitrogen atmosphere it was found to be about 72%. As a result of thermogravimetric analysis, the content of sulfur in the S-AC was found to be 69%.

In TGA, the S-BOP showed no mass loss at temperatures up to 200° C., and this suggests that sulfur is covalently bonded to the polymer backbone. Sulfur linked by covalent bonds can also be ascertained from derivative of the mass loss curve (orange curve) indicating a peak at 320° C.

On the other hand, it was confirmed from the TGA results for the BOP that mass reduction started at 150° C., which is significantly lower than that for the S-BOP. From this, it can be seen that the covalently bonded sulfur plays a role in enhancing the stability of the benzoxazine polymer.

(3) Morphology Analysis of Polymer-Sulfur Copolymer

Figure 6:
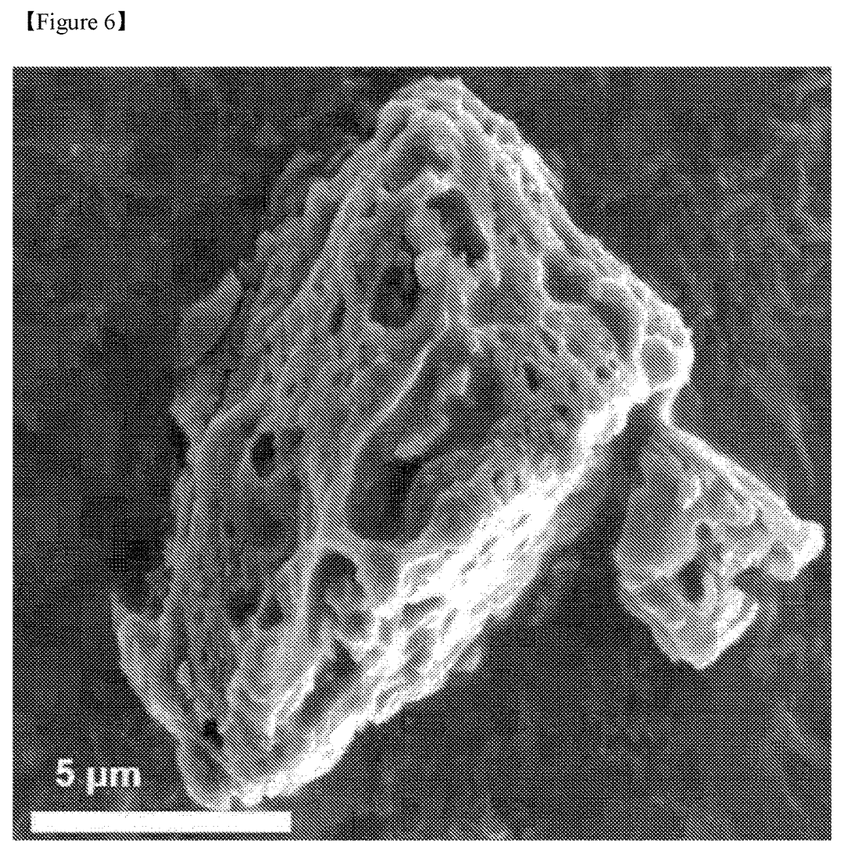
FIG. 6 is a photograph of scanning electron microscopy (SEM) of the S-BOP prepared in Example 1.

A scanning electron microscopy (SEM) photograph of the S-BOP was shown in FIG. 6. Referring to FIG. 6, it can be seen that the S-BOP is amorphous and has a micro-sized particle shape. As a result of EDAX (energy-dispersive X-ray) spectroscopy, it was found that sulfur is uniformly distributed in this particle. Also, it was confirmed from X-ray photoelectron spectroscopy (XPS) analysis that the S-BOP consisted only of carbon, nitrogen, oxygen and sulfur elements.

<Experimental Example 2> Evaluation of Battery Characteristics

Evaluation of battery characteristics was carried out on the batteries prepared in Example 1, Comparative Example 1 and Comparative Example 2. Hereinafter, all current densities and specific capacities are described based on the mass of the sulfur.

Figure 7:
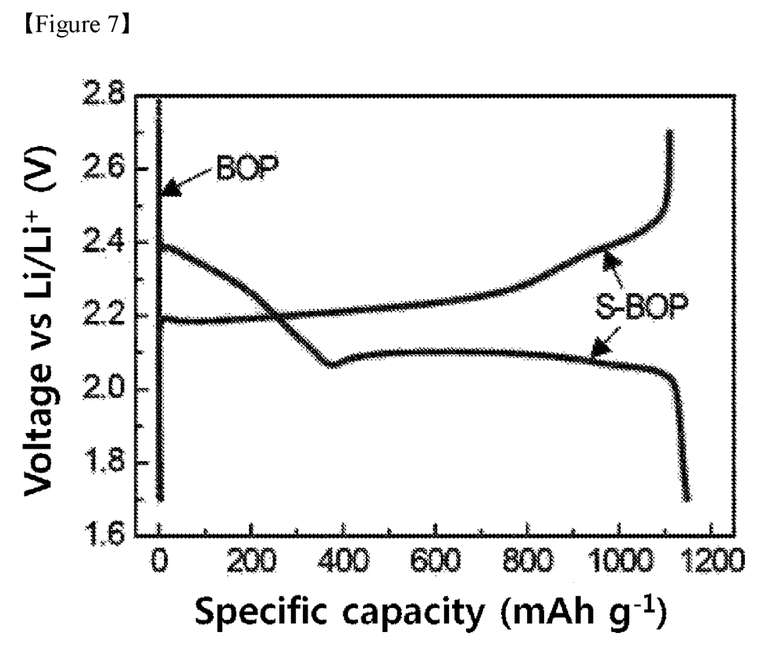
FIG. 7 is a graph of the first discharge-charging voltage obtained by measuring the batteries prepared in Example 1 and Comparative Example 1 at a c-rate of C/20 (=36 mA/g).

FIG. 7 shows a graph of the first discharge-charge voltage obtained by measurement at a c-rate of C/20 (=36 mA/g). Unlike the fact that the conventional sulfur mixed electrodes exhibit a stabilization period at 2.1 and 2.4 V due to the two-stage reduction of sulfur, the S-BOP electrode showed a discharge graph with a steep slope in the range of 2.05 to 2.4 V. This indicates that the S-BOP has a C—S bond and thus the conversion of S8 to $Li_2S_8$ was buried in the S-BOP. The XRD spectrum showed the presence of crystalline S8 in the S-BOP, but the presence of crystalline S8 was masked at the lower c-rate.

It was shown that the initial discharge and charge capacities of the S-BOP were 1149 and 1110 mAh/g, and the initial coulombic efficiency was 96.6%. The initial coulombic efficiency value suggests that capture of lithium ion on the polymer matrix and the shuttling of the polysulfide were successfully inhibited. This value is also in contrast to those from previously known polymers with high sulfur content, which usually showed initial coulombic efficiencies of 100% or more due to the shuttle phenomenon.

On the other hand, under the same conditions, the BOP showed little electrochemical activity for lithium ion. From this, it can be seen that the redox activity exhibited by the S-BOP is due to the sulfur chain.

Figure 8:
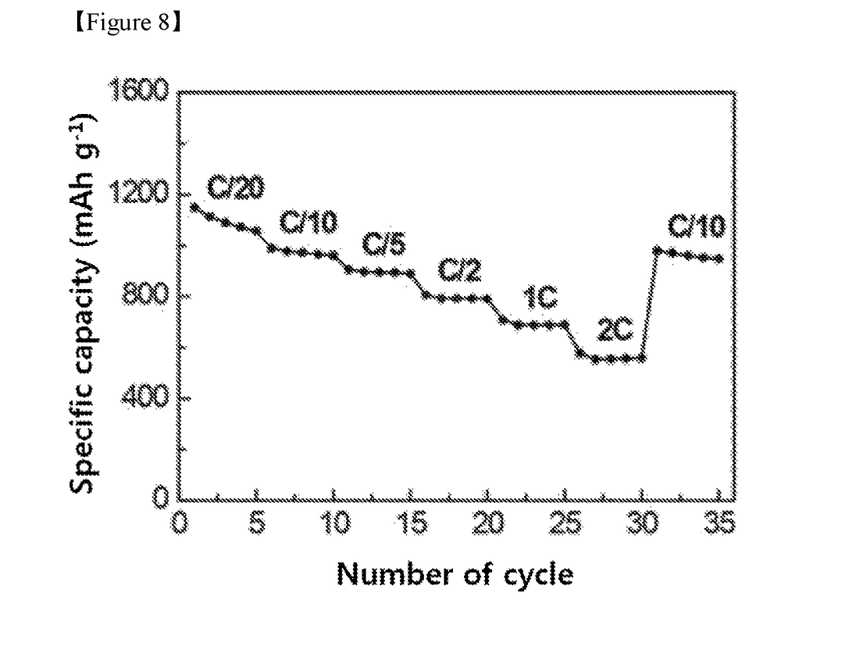
FIG. 8 is a graph of rate performance at different c-rates of the battery prepared in Example 1.
Figure 9:
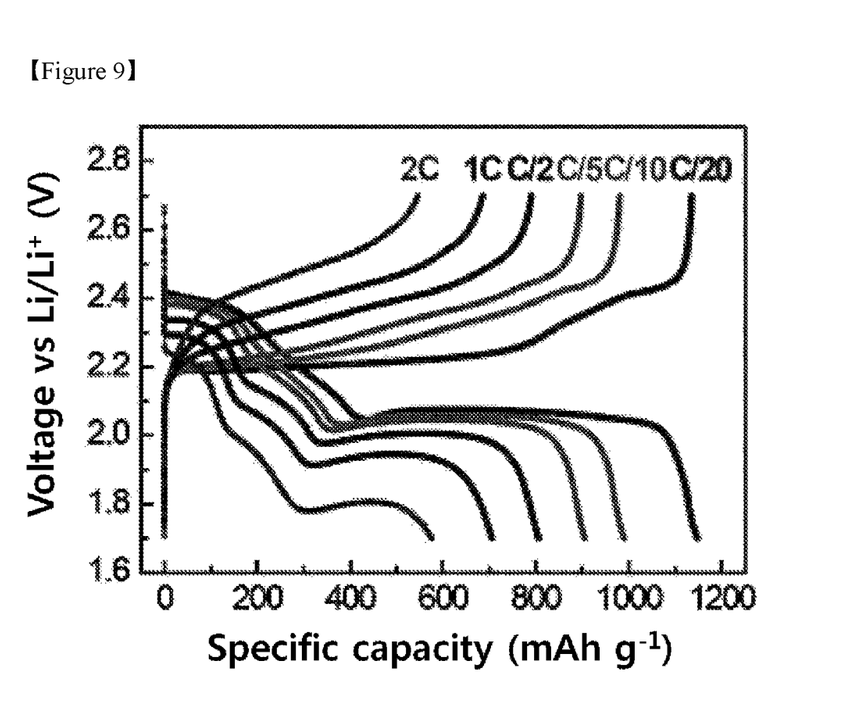
FIG. 9 is a graph of voltage at different c-rates of the battery prepared in Example 1.

The rate performances and voltage graphs at different c-rates of the S-BOP electrodes are shown in FIGS. 8 and 9, respectively.

As shown in FIG. 8, the S-BOP showed excellent rate performance (1C=720 mAh/g). When the current density increased by 2, 4, 10, 20 and 40 times from C/20, the S-BOP was maintained at 86.2, 78.8, 70.2, 61.5, and 50.2% relative to the reversible capacity (1148 mAh/g) at C/20. Also, when the current density recovered to C/10, 99.0% of the initial capacity was recovered.

Referring to FIG. 9, it can be seen that as the c-rate increases, the upper discharge stagnation period (the region before the second flat stagnation) is more clearly divided into two parts. This is due to two different atomic arrangements of sulfur wherein the upper part is due to S8 and the lower part is due to the sulfur chain attached to the polymer backbone. Since the interior of the S-BOP has a structure in which S8 is surrounded by sulfur chain, the sulfur chain becomes the first accessible part of the incoming lithium ion, and then the S8 can be used. If the c-rate increases, the effectiveness of S8 becomes more important at the beginning of the lithiation, so the above results will appear.

Figure 10:
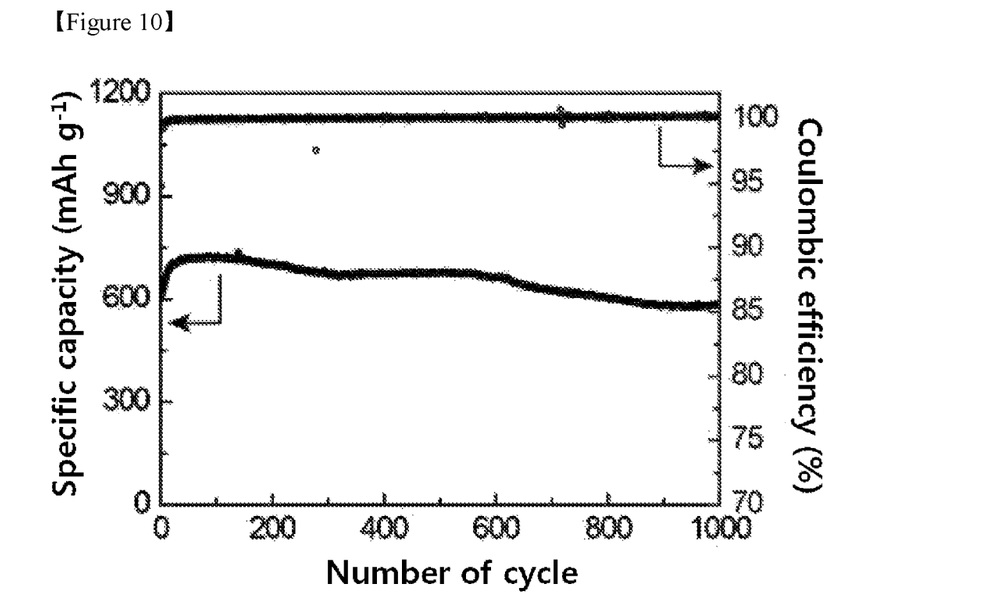
FIG. 10 is a graph showing the cycle characteristics and the coulombic efficiency under the condition of 1C (720 mAh/g) of the battery prepared in Example 1.

FIG. 10 is a graph showing the cycle characteristics and coulombic efficiency of the S-BOP under the condition of 1C (720 mAh/g). The S-BOP showed excellent cycle characteristics showing 92.7% of the initial capacity (630 mAh/g) after 1000 cycles. During the initial cycle, the specific capacity gradually increased from 630 mAh/g (second cycle) to 705 mAh/g (30th cycle). This may be due to the particular electrode activation process. That is, initial cycle period is required to obtain full accessibility to the impregnated sulfur.

The excellent reversibility of each cycle resulted in high coulombic efficiency. The coulombic efficiencies in the 2nd, 5th, 50th, 200th, 500th and 1000th cycles were 94.8, 99.8, 100.0, 100.2, 100.3, and 100.4%, respectively. This excellent performance is because the dissolution of the polysulfide was suppressed and the sulfur is distributed in the state trapped in the polymer.

Figure 11:
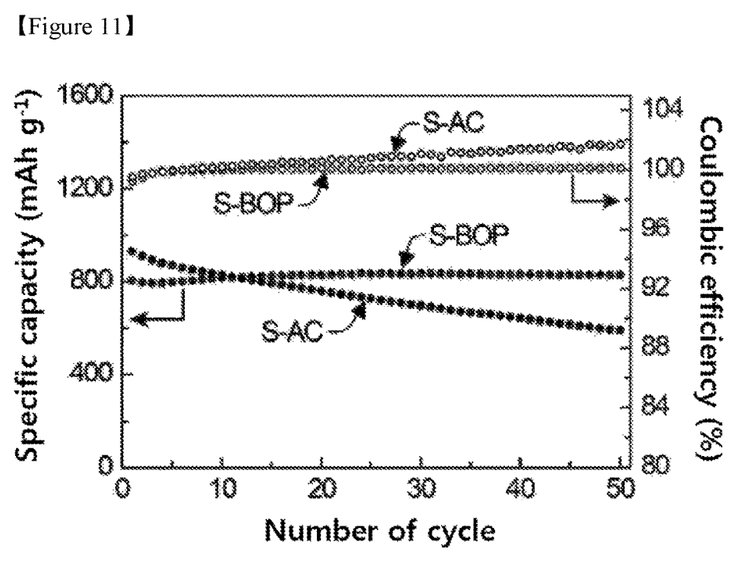
FIG. 11 shows the cycle characteristics of the batteries prepared in Example 1 and Comparative Example 2.

To illustrate the covalently bonded effect of sulfur on the polymer backbone, the cycle characteristics of the S-BOP were compared with the cycle characteristics of the S-AC (FIG. 11). At C/2 (360 mAh/g), the two electrodes showed distinct cycle stability. The specific capacity of the S-BOP continuously increased from 806 mAh/g (first cycle) to 832 mAh/g (25th cycle) due to the electrode activation process and finally increased to 828 mAh/g in the 50th cycle which corresponds to a capacity retention rate of 102.8% when compared to the second cycle. In contrast, the S-AC showed a high capacity of 930 mAh/g in the second cycle, but it was remarkably decreased to 591 mAh/g in the 50th cycle and thus showed a capacity retention rate of 63.5%. Also, in the eighth cycle of the S-AC, the coulombic efficiency exceeded 100%, indicating that the polysulfide dissolution increased as the cycle is repeated.

Figure 12:
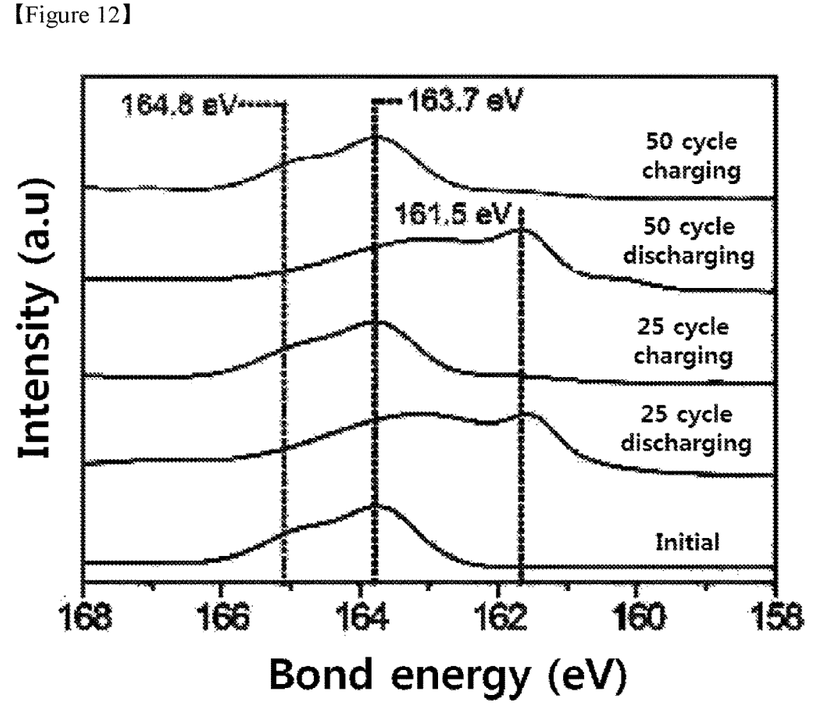
FIG. 12 shows the results of ex-situ XPS analysis of S 2p of the S-BOP prepared in Example 1.

The cause of cyclic stability of the S-BOP was confirmed through ex-situ X-ray photoelectron spectroscopy (ex-situ XPS) and cross-sectional SEM. Referring to FIG. 12, it can be seen that S 2p peaks are reversibly transferred in each cycle during charging and discharging. The 163.7 and 164.8 eV peaks are due to the S—S and C—S bonds, respectively, which show the bond structure of the S-BOP and the stability of the bonds which are remained in the synthesized state even after the 50th cycle. From this, it can be confirmed that the S-BOP can react reversibly. In particular, the inhibition of the dissolution of the polysulfide can be confirmed by the fact that sulfide (161.5 eV) and polysulfide (162.3~163.9 eV) peaks remain constant during charging and discharging.

Changes in electrode thickness were observed by SEM analysis. For the S-BOP, the thickness started at 20.9 μm before the cycle and increased to 24.7 μm after the 25th cycle due to electrode swelling during the initial cycle. After the 25th cycle, the thickness was maintained around 24.7 μm. This indicates that the stable structure is maintained even when the electrodes are charged and discharged. On the other hand, for the S-AC, it started firstly at 30.1 μm and remained at the similar level until the 25th cycle. However, in the 50th cycle, the thickness increased to 35.1 μm. This can be attributed to the fact that the swelling phenomenon due to the unstable electrode-electrolyte interface by the volumetric expansion of the active material and the dissolution of the polysulfide during the initial cycle was accommodated by the empty space of the electrode. However, after a certain number of cycles, electrode swelling continued to increase the thickness of the electrode.

The chemical impregnation of sulfur in the S-BOP has an advantage in volumetric capacity because the chemical bonds between carbon and sulfur allow to have a higher tap density compared to physical mixing. For 1.0 g of the same weight, the volumes of the 5-BOP, the S-AC and $LiCoO_2$ are 1.8, 2.1 and 0.9 mL, respectively. This distinctive tap density is expected to affect the volumetric capacity of the electrode. To demonstrate this, all the electrodes were roll-pressed as closely as possible to commercial battery conditions. As a result, the S-BOP, the S-AC, and $LiCoO_2$ electrodes exhibited volumetric capacities of 884.0, 630.2, 520.8 $mAh/cm^3$, respectively. From this, it can be seen that the S-BOP electrode has the volumetric capacity 1.7 times higher than commercially available $LiCoO_2$ electrode. Here, $LiCoO_2$ contains 93% by weight of active material. For most secondary batteries, the volumetric capacity is more important than the gravimetric capacity, so the structural properties based on the C—S covalent bond of the S-BOP are believed to be a great advantage in terms of compatibility.

<Experimental Example 3> Electrode Loading and Cycle Life Characteristics

The electrode loading and cycle life characteristics of the batteries prepared in Examples 1 to 5 and Comparative Example 2 were analyzed, and the results are shown in Table 1 below.

TABLE 1

| | Monomer | Monomer:Sulfur (Weight ratio) | Electrode loading ($mAh/cm^2$) | 95% deduction cycle relative to initial capacity |
|---|---|---|---|---|
| Example 1 |  | 1:5 | 1.5 | 820 |
| Example 2 |  | 1:3 | 0.9 | 835 |
| Example 3 |  | 1:10 | 2.2 | 460 |
| Example 4 |  | 1:5 | 1.3 | 230 |

TABLE 1-continued

| Monomer | Monomer:Sulfur (Weight ratio) | Electrode loading (mAh/cm²) | 95% deduction cycle relative to initial capacity |
|---|---|---|---|
| Example 5  | 1:5 | 1.8 | 135 |
| Comparative Example 2 — Activated carbon | 3:7 | 2.0 | 10 |

As shown in Table 1 above, all of the batteries to which the S-BOPs, which are the polymer-sulfur copolymers of Examples 1 to 5, were used, showed that the cycle characteristic is increased by about 13.5 to 83.5 times based on the point of 95% reduction relative to the initial capacity, as compared with the battery using the S-AC of Comparative Example 2.

Specifically, from Examples 1 to 3 show the content relevant to the characteristics of the batteries according to the content ratio of monomer and sulfur in the polymer-sulfur copolymer of the present invention. Referring to Examples 1 to 3, after preparing the electrode while changing the content of sulfur to the monomer, its loading amount and the reduction rate relative to the initial capacity were confirmed. That is, it can be seen that as the sulfur content increases, the loading amount of the electrode increases, but the capacity reduction of the battery relative to the initial capacity is in a trade-off to each other, which occurs more rapidly. Through this, it can be seen that the battery characteristics can be effectively controlled by appropriately controlling the weight ratio of monomer and sulfur.

In addition, through Examples 1, 4 and 5, the changes in the battery characteristics depending on the type of monomer used in the preparation of the polymer-sulfur copolymer were confirmed.

Referring to Examples 1 and 4 above, In the case of benzoxazine (Example 1) having the phenyl group (aromatic) as the functional group and monomer having the alkyl group (aliphatic) (Example 4), it can be seen that a similar loading amount of electrode could have been achieved, but there is a large difference in capacity change, and it is more advantageous in terms of life characteristics when having the aromatic group rather than the aliphatic group.

In addition, referring to Examples 1 and 5, it can be seen that the case of benzoxazine (Example 1) in the skeleton structure is more advantageous in terms of life characteristics than the case of benzothiazine (Example 5).

The polymer-sulfur copolymer of the present invention has a structure in which sulfur is covalently linked in a polymer carrier and is characterized in that the distribution of sulfur is uniform and the impregnation amount of sulfur is high. Therefore, when used as a positive electrode active material for a lithium-sulfur battery, a battery improved in the problem of dissolution of the polysulfide or the carrier while having excellent battery characteristics can be realized.

Since the lithium-sulfur battery according to the present invention stably exhibits excellent discharge capacity, output characteristics and capacity retention rate, it is useful for portable devices such as mobile phones, notebook computers, and digital cameras, and electric vehicles such as hybrid electric vehicles (HEVs), etc.

The invention claimed is:

1. A polymer-sulfur copolymer formed by polymerization of monomers represented by the following formula (1) and elemental sulfur:

[Formula 1]

wherein,

X is O or S,

Y is H, a C1 to C6 alkyl group or a C6 to C12 aryl group,

Z is a $S_nH$ group, a C1 to C6 alkyl group containing at least one S—S bond, or a C6 to C12 aryl group containing at least one S—S bond, n is an integer of 1 to 6.

2. The polymer-sulfur copolymer according to claim 1, characterized in that in formula (1),

X is O or S,

Y is H, a C1 to C4 alkyl group or a C6 to C8 aryl group,

Z is SH, S—SH, a C1 to C4 alkyl group containing at least one S—S bond, or a C6 to C8 aryl group containing at least one S—S bond.

3. The polymer-sulfur copolymer according to claim 1, characterized in that the monomer of formula (1) is at least one selected from the compounds represented by the following formulas (2) to (6):

[Formula 2]

[Formula 3]

[Formula 4]

[Formula 5]

[Formula 6]

4. The polymer-sulfur copolymer according to claim 1, characterized in that the polymer-sulfur copolymer is a copolymer prepared by polymerizing the monomer and elemental sulfur at a weight ratio range of 1:2 to 1:20.

5. The polymer-sulfur copolymer according to claim 1, characterized in that the polymer-sulfur copolymer has an amorphous crystalline structure.

6. A preparation method of the polymer-sulfur copolymer characterized by comprising;
mixing the monomer represented by the following formula (1) and elemental sulfur to form a mixture;
subjecting the mixture to a first heat treatment to impregnate the liquefied sulfur with monomer;
subjecting the mixture subjected to the first heat treatment to a second heat treatment to copolymerize the monomer and elemental sulfur; and
subjecting the mixture subjected to the second heat treatment to a third heat treatment to perform a vulcanization reaction:

[Formula 1]

wherein,
X is O or S,
Y is H, a C1 to C6 alkyl group or a C6 to C12 aryl group,
Z is a $S_nH$ group, a C1 to C6 alkyl group containing at least one S—S bond, or a C6 to C12 aryl group containing at least one S—S bond,
n is an integer of 1 to 6.

7. The preparation method according to claim 6, characterized in that the temperature for the first heat treatment is 140 to 170° C.

8. The preparation method according to claim 6, characterized in that the temperature for the second heat treatment is 170 to 200° C.

9. The preparation method according to claim 6, characterized in that the temperature for the third heat treatment is 200 to 250° C.

10. A lithium-sulfur battery comprising a positive electrode; a negative electrode; a separator interposed between the positive electrode and the negative electrode; and an electrolyte, characterized in that the positive electrode comprises a polymer-sulfur copolymer according to claim 1 as an active material.

* * * * *